Figure 1:
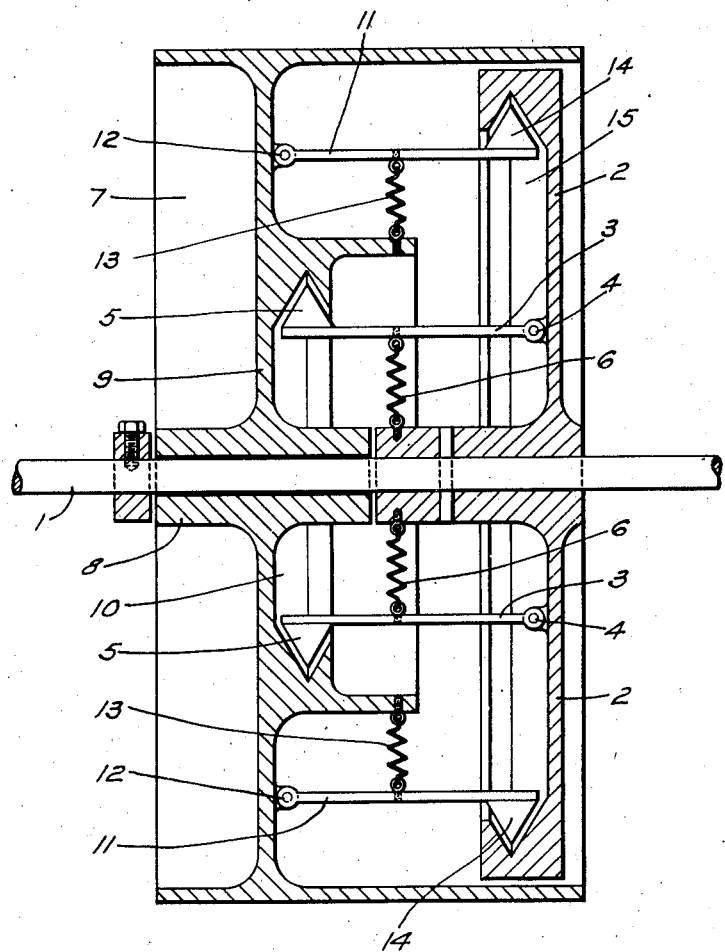

Aug. 4, 1931.  J. BETHENOD ET AL  1,817,542
CENTRIFUGAL CLUTCH
Filed April 22, 1927   2 Sheets-Sheet 1

INVENTORS
Joseph Bethenod &
Hugues Goudet
BY
ATTORNEY

Aug. 4, 1931.  J. BETHENOD ET AL  1,817,542
CENTRIFUGAL CLUTCH
Filed April 22, 1927    2 Sheets-Sheet 2
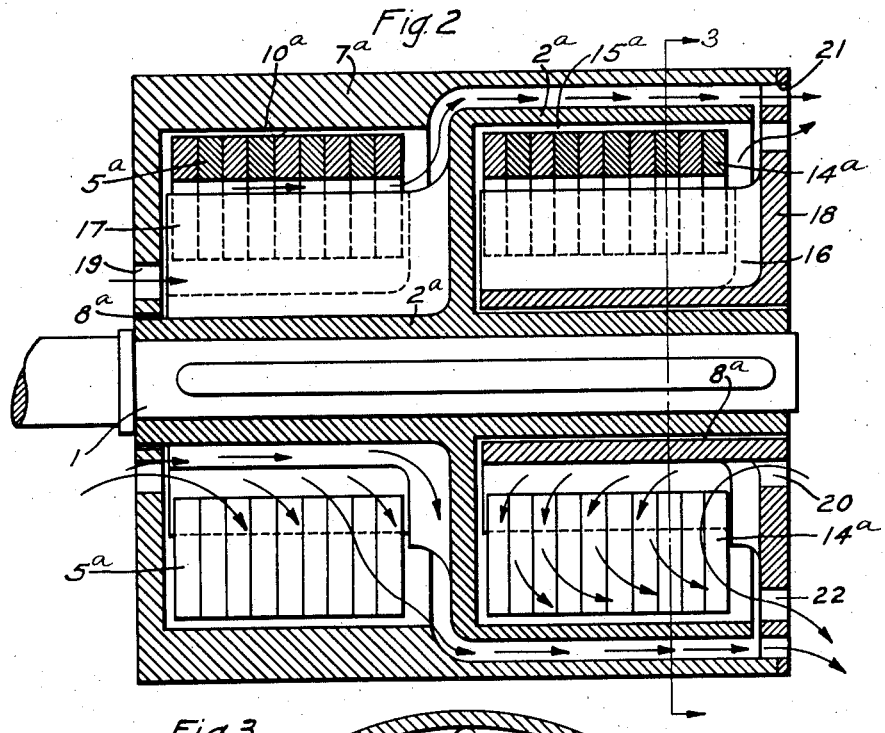
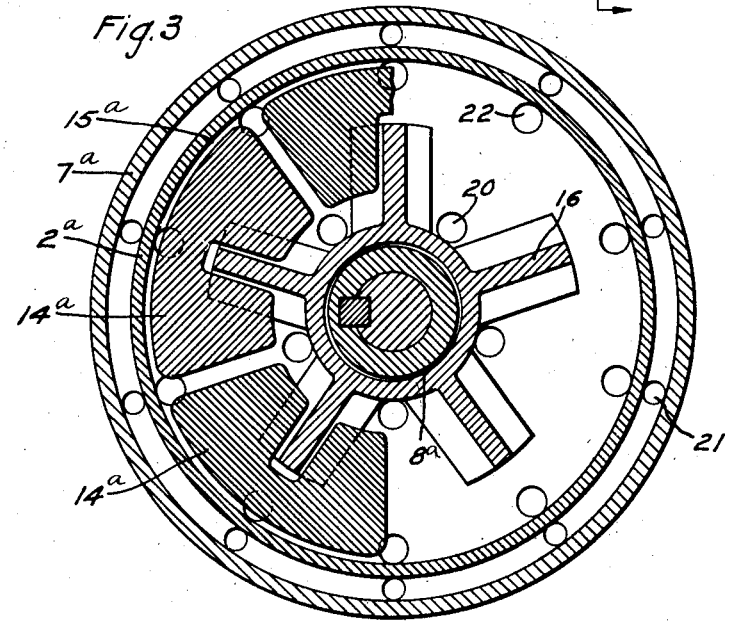
INVENTORS
Joseph Bethenod &
Hugues Goudet
BY
ATTORNEY Patented Aug. 4, 1931

1,817,542

UNITED STATES PATENT OFFICE

JOSEPH BETHENOD AND HUGUES GOUDET, OF PARIS, FRANCE

CENTRIFUGAL CLUTCH  REISSUED

Application filed April 22, 1927, Serial No. 185,770, and in France May 10, 1926.

Our invention relates to centrifugally controlled means for coupling motors and the loads to be driven by them and, more particularly, to centrifugally actuated clutches for coupling induction electric motors and machine tools or other load devices to be driven thereby.

Clutches embodying means for utilizing centrifugal force have heretofore been employed in starting machine tools driven by squirrel-cage induction motors, it being well known that a motor of the type just mentioned has a relatively low starting torque and that the use of a clutch embodying means for utilizing centrifugal force permits starting the motor under reduced load.

A close study of the problem shows, however, that a centrifugal clutch can give satisfactory results only by adding certain elements, it being essential that the clutch shall permit the motor to carry a momentary overload without slipping.

It has been proposed, therefore, to employ a lubricant to partially neutralize the action of the clutch during the first moment of starting. Because of the use of a lubricant, the torque applied to the motor during the starting may be maintained below the maximum torque which the clutch can withstand without slipping, once the supply of lubricant between the engaging surfaces is dispersed under the action of the centrifugal force.

The presence of a lubricant necessitates a certain care of the apparatus, and the surrounding temperature may eventually influence the operation.

Hence, such a solution would hardly permit the adjustment of the clutch to the different conditions of use and could not be suitable when the inertia of the revolving parts of the machine tool is considerable.

Other solutions have been proposed, with the object of obtaining the desired retardation in the operation of a clutch, but they are all complicated and delicate.

The object of the present invention is to provide a simple and strong construction which will ensure the starting of an electric motor of the induction type under the most favorable conditions for each application.

Our invention will be readily understood by referring to Fig. 1 of the drawings, which is a longitudinal, sectional view, somewhat schematic in character, of one embodiment thereof.

Fig. 2 is a longitudinal, sectional view of a preferred embodiment of our invention, and Fig. 3 is a transverse sectional view on line 3—3 of Fig. 2, some of the parts being broken away.

Referring first to Fig. 1, shaft 1 of the motor (not shown) has a circular plate 2 rigidly fastened to it which carries a plurality of levers 3, pivoted to it at 4. The levers 3 have shoes 5 at their free ends that are biased toward the axis of rotation by means of springs 6.

A pulley 7, which is operatively connected to the machine tool or other load device, has a hub 8 mounted loosely upon shaft 1. The web 9 of the pulley 7 has a groove 10 to be engaged by the shoes 5. A plurality of levers 11 are pivoted to the web 9 at 12 and are biased toward the axis of rotation by springs 13. The free ends of the levers 11 are provided with shoes 14 to engage a groove 15 in plate 2.

The operation of the apparatus is as follows:

As the speed of rotation of shaft 1 increases, the centrifugal force impels the shoes 5 against the walls of the groove 10, thus progressively exerting a torque upon the pulley 7, the maximum of which can be determined by suitably designing the various cooperating elements; this torque may be chosen, for example, to be equal to the normal torque of the motor. Consequently, the pulley 7 begins to turn at a rate of acceleration which depends on the inertia of the revolving parts of the driven machine. As soon as the speed increases sufficiently, shoes 14, through the action of centrifugal force, engage the walls of the groove 15 and complete the progressive clutching between the shaft 1 and the pulley 7.

It will be understood that the simultaneous action of the shoes 5 and 14, when the pulley 7 is completely clutched to the shaft 1, may be sufficient to avoid any slipping in case the motor carries a certain overload.

It is understood that the maximum torque due to the action of shoes 5 may be selected differently from the normal torque in accordance with the considered application.

On the other hand, it is quite evident that the laws of variation of the stress exercised by shoes 5 and 14, respectively, to the angular speed may also be determined in each case; for instance, it may be advantageous to ensure, by any suitable expedient, application of the shoes 14 only in case pulley 7 reaches a speed close to normal speed.

It is understood that the embodiment shown in Fig. 1 is subject to a great many variations, as, for instance, the number of levers 3 and 11, the shape of the grooves 10 and 15 and the character of the springs 6 and 13, which, in fact, could be omitted, if desired.

Figs. 2 and 3 show a preferred embodiment of the invention, which is, in practice, a very strong apparatus and not expensive.

Shaft 1 has a key seated member $2^a$ which is located inside the pulley $7^a$. The pulley is mounted loosely upon the member $2^a$, as indicated at $8^a$, $8^a$, and has a removable cover 18 which permits mounting it in position. The cover 18 is provided with radial wings 16 which are uniformly distributed and which carry with them independently movable parts $14^a$ in their rotation, while allowing them a certain radial displacement.

Member $2^a$ is also provided with wings 17 which carry independently movable parts $5^a$ having the same shape as the parts $14^a$.

As soon as shaft 1 speeds up, the parts $5^a$ are forced, by centrifugal action, against the interior surface $10^a$ of the pulley $7^a$, thus starting the operation, as before. As soon as a certain speed is reached, the friction of parts $14^a$ against the interior surface $15^a$ of the bell of the member $2^a$ completes the clutch-action, as was explained in connection with what is shown in Fig. 1.

With this construction, all countersprings for parts $5^a$ and $14^a$ will generally be unnecessary, but the use of them remains a possibility. Then again, parts 5 and 14, or the corresponding parts $5^a$ and $14^a$, may be made of different weights by differences in shape or by employing materials of different densities, although the adoption of a single shape and a single material will be more advantageous for manufacturing reasons. By changing the widths of the friction parts to conform to the axes of different pulleys, it is, of course, possible to modify the relation of the corresponding friction torques of the two clutches.

It is also to be noted that the parts in question, as shown in Figs. 2 and 3, are constituted by multiplying elementary parts of the same length, in accordance with the length of the pulley. Also, by making the multiple parts of different materials, it is possible to vary, within very great limits, the ratio of the friction torques exercised by surfaces $10^a$ and $15^a$, Besides, such a preferred arrangement of the invention offers a considerable advantage, so far as the friction members themselves are concerned, for each elementary part acts independently under the action of the centrifugal force and one can thus dispose surely of a great number of friction points, even in case the finish of the rubbing parts is not quite perfect.

There is another important inconvenience which has been found with the clutches at present in use and which consists in the abnormal heating, resulting from the operation of the apparatus. To obviate efficiently this heating, openings 19, 20, 21, and 22 are provided as another important characteristic of the invention. Air enters through the openings 19 and 20 near shaft 1 and escapes through openings 21 and 22 situated near the periphery, after having cooled the various elements of the apparatus. The circulation of the air is materially increased by the disposition of parts $5^a$ and $14^a$ and the wings 16 and 17, each unit constituting a real centrifugal ventilator.

Finally, it is to be noted that certain dispositions which are described herein, and particularly the division of the parts and the internal ventilation of the pulley may be very advantageously applied to simple clutches, that is to say, those having no double friction.

What we claim and desire to secure by Letters Patents of the United States is:

1. A centrifugal clutch for coupling a motor to its load comprising two sets of successively actuated members working in parallel, the action of one of which depends upon the speed of the driving motor and the action of the other of which depends upon the speed of the load driven by the said motor, the centrifugally actuated members being composed of elements of like clutch-face contour.

2. A centrifugal clutch for coupling a motor to its load comprising two sets of successively acting members working in parallel, the action of one of which depends upon the speed of the driving motor and the action of the other of which depends upon the speed of the load driven by the said motor, each of the centrifugally actuated members being composed of a plurality of elements of like contour and being both jointly and severally operative.

3. A centrifugal clutch for coupling an electric motor to its load comprising two successively acting sets of elements, the action of one of which depends upon the speed of the driving motor and is reinforced by the second set, the action of which depends upon the speed of the load driven by the said motor, each of the centrifugally actuated sets being composed of like elements, rotation of which is effected by means of wings which ensure internal ventilation of the clutch.

JOSEPH BETHENOD.
HUGUES GOUDET.